United States Patent
Teixeron et al.

(10) Patent No.: US 9,800,574 B2
(45) Date of Patent: Oct. 24, 2017

(54) METHOD AND APPARATUS FOR PROVIDING CLIENT-SIDE SCORE-BASED AUTHENTICATION

(71) Applicants: Guillaume Teixeron, Le Bouscat (FR); Sebastien Lavigne, Le Bouscat (FR)

(72) Inventors: Guillaume Teixeron, Le Bouscat (FR); Sebastien Lavigne, Le Bouscat (FR)

(73) Assignee: VASCO Data Security, Inc., Oakbrook Terrace, IL (US)

(*) Notice: Subject to any disclaimer, the term of this patent is extended or adjusted under 35 U.S.C. 154(b) by 90 days.

(21) Appl. No.: 14/585,869

(22) Filed: Dec. 30, 2014

(65) Prior Publication Data

US 2015/0188913 A1    Jul. 2, 2015

Related U.S. Application Data (60) Provisional application No. 61/922,516, filed on Dec. 31, 2013.

(51) Int. Cl.
| | |
|---|---|
| *H04L 29/00* | (2006.01) |
| *H04L 29/06* | (2006.01) |
| *G06F 21/57* | (2013.01) |
| *H04W 12/12* | (2009.01) |
| *G06F 21/31* | (2013.01) |
| *H04L 9/08* | (2006.01) |
| *H04W 12/06* | (2009.01) |

(52) U.S. Cl.
CPC .......... *H04L 63/0838* (2013.01); *G06F 21/31* (2013.01); *G06F 21/57* (2013.01); *H04L 9/0863* (2013.01); *H04L 63/1433* (2013.01); *H04W 12/12* (2013.01); *H04L 63/067* (2013.01); *H04L 63/10* (2013.01); *H04W 12/06* (2013.01)

(58) Field of Classification Search
CPC ............................ H04L 29/06; G06F 17/30
USPC ........................................................... 726/1
See application file for complete search history.

(56) References Cited

U.S. PATENT DOCUMENTS

| | | | |
|---|---|---|---|
| 8,819,769 B1* | 8/2014 | van Dijk | H04L 63/0876 726/1 |
| 9,240,986 B1* | 1/2016 | Ackerman | G06F 21/34 |
| 2011/0167011 A1 | 7/2011 | Paltenghe et al. | |
| 2013/0097701 A1 | 4/2013 | Moyle et al. | |

FOREIGN PATENT DOCUMENTS

WO    2004/051585 A2    6/2004

* cited by examiner

*Primary Examiner* — Brandon Hoffman
*Assistant Examiner* — Michael D Anderson
(74) *Attorney, Agent, or Firm* — O'Rourke Law Office, LLC (57) ABSTRACT

Methods, apparatus, and systems for generating and verifying one time passwords in connection with a risk assessment are disclosed. The risk assessment may comprise a client-side risk assessment. The risk assessment may also comprise a server-side risk assessment.

25 Claims, 2 Drawing Sheets

METHOD AND APPARATUS FOR PROVIDING CLIENT-SIDE SCORE-BASED AUTHENTICATION

CROSS-REFERENCE TO RELATED APPLICATIONS

This application claims priority to U.S. Provisional Application Ser. No. 61/922,516, entitled "A method and apparatus for providing client-side score-based authentication", filed on Dec. 31, 2013, the contents of which are incorporated fully herein by reference.

The invention relates to securing remote access to computers and applications and remote transactions over computer networks. More specifically, the invention relates to methods and apparatus for authenticating users.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

In one solution a dynamic password is generated which the user passes to the application instead of (or in addition to) a static password. The dynamic password is generated on the client side by cryptographically combining a dynamic variable with a cryptographic secret that is shared between the client-side apparatus on the one hand and a server-side verification entity on the other hand. The dynamic variable can be a time-based value, a counter-based value, a challenge (which, for example, may be provided by the application server), or even transaction data representing the transaction the user wants to submit to the application server, or any combination of the foregoing. The dynamic variable can be cryptographically combined with the shared cryptographic secret, for example, by applying a symmetric cryptographic algorithm to the dynamic variable that is parameterized with the shared cryptographic secret. For example, the dynamic variable can be encrypted using a symmetric encryption algorithm such as AES (Advanced Encryption Standard) or a concatenation of the dynamic variable and the shared secret can be hashed by a hashing algorithm such as SHA-1 (Secure Hashing Algorithm 1). In many cases the resulting cryptogram is truncated and then converted into a string of characters. This string of characters, often called a one-time password or OTP, is then displayed to the user for the user to manually copy and transfer to an application. If the dynamic variable is based on a challenge then the string of characters may be referred to as a response. If the dynamic variable is based on a challenge then the string of characters could be considered to be a signature over the transaction data. In what follows the term OTP may refer also to such responses or signatures. Because OTPs are often manually copied by the user, they are typically kept rather short, usually shorter than the cryptogram from which they have been made. At the application server side the received OTP can then be verified. This typically happens by generating an expected reference value for the OTP and comparing the received OTP with the generated reference value. The client devices to generate the OTPs include dedicated hardware authentication tokens with their own display and sometimes with a keypad for entry of a PIN (Personal Identification Number), or general purpose computing devices such as for example, smart phones running authentication software for emulating dedicated hardware authentication tokens.

DISCLOSURE OF THE INVENTION

The invention is based on an insight of the inventors that the overall security level of a solution based on one-time passwords may depend on the circumstances, platform and context wherein a one-time password has been generated, but that the server which verifies the validity of the OTP only indicates a binary result indicating whether the verified OTP is cryptographically correct or not without taking into account any of these circumstances and context which may affect the overall security level. For example, the risk that a software authentication application on a smartphone has been hacked is much higher than for a dedicated hardware authentication token. If the client device for generating the OTP is located at the moment of generating the OTP in a completely different country than the user's home country, then this may also be an indication that something is wrong.

The invention is furthermore based on another insight of the inventors that even if a server were capable of taking into account such information about the context and the circumstances surrounding generation of the OTP, it may in practice be difficult or even impossible for the server to obtain this information. It may in particular be very difficult for a server to obtain local information linked to the client device itself since in many cases the only communication channel between the client device and the server is the user manually copying data between the client device and the server. For convenience reasons the amount of information that the user must manually transfer from the server to the token and from the token to the server must be limited to the strict minimum.

One aspect of the invention provides a method for generating an enhanced one-time password (OTP). In some embodiments the method may comprise the steps of: performing a first risk analysis; generating risk information data representing a result of said first risk analysis; determining a first value of a dynamic variable; generating cryptographic OTP data by cryptographically combining said first value of said dynamic variable with a cryptographic secret; and obtaining said enhanced OTP by combining said cryptographic OTP data with said risk information data.

In some embodiments the method may be a method of any of the previous embodiments wherein performing said first risk analysis may comprise making a risk assessment for each of one or more risk factors. In some embodiments generating the risk information data may comprise combining the results of all said risk assessments of said one or more risk factors. In some embodiments said first risk analysis may comprise grouping said one or more risk factors into one or more risk factor categories and determining for each of said one or more risk factor categories a risk assessment category score using the results of said risk assessments of all risk factors of the corresponding risk factor category and wherein said generating the risk information data comprises combining the risk assessment category scores of said one or more risk factor categories. In some embodiments each risk assessment category score may be represented as a bit string and said generating the risk information data may comprise concatenating the bits of the various bit strings corresponding to said one or more risk factor categories into a risk information bit string and said risk information data may comprise a representation of said risk information bit string. In some embodiments the first risk analysis is done on a client device that is being operated by a user and said one or more risk factor categories may comprise at least one of: a platform risk factor category, that groups all risk factors related to characteristics of the client device itself; a user risk factor category, that groups all risk factors related to characteristics of the user and characteristics of the behaviour of the user; or a context risk factor category, that groups all risk factors related to characteristics of the context or the environment that the client device is operating in. In some embodiments the one or more risk factor categories may comprise all three of the platform risk category, the user risk factor category and the context risk factor category.

In some embodiments generating the cryptographic OTP data may comprise cryptographically combining the risk information data and the first value of the dynamic variable with a cryptographic secret. In some embodiments cryptographically combining said first value of said dynamic variable with said cryptographic secret comprises performing a cryptographic algorithm that uses said value of said dynamic variable and that is parameterized with said cryptographic secret. In some embodiments the cryptographic algorithm may be a symmetric cryptographic algorithm and the cryptographic secret may be shared with an entity that may be adapted to verify or validate the enhanced OTP. The symmetric cryptographic algorithm may, for example, comprise a symmetric encryption or decryption algorithm such as AES (Advanced Encryption Standard) or a keyed hashing algorithm such as HMAC (Hash-based Message Authentication Code). In some embodiments the symmetric cryptographic algorithm may also use the risk information data.

In some embodiments the dynamic variable may be time-based. For example, the dynamic variable may comprise the value of a clock that may be comprised in a client device generating the enhanced OTP. In some embodiments the dynamic variable may be based on a counter which, for example, may be stored and maintained on the client device. In some embodiments the dynamic variable is based on a challenge which, for example, may be provided by the application that the user is interacting with. In some embodiments the dynamic variable may be based on data representative of a transaction request that the user may have submitted to the application and that the enhanced OTP may be associated with.

In some embodiments obtaining said enhanced OTP by combining the cryptographic OTP data with the risk information data comprises generating a masked representation of the risk information data using the risk information data and a part of the cryptographic OTP data, and combining the cryptographic OTP data with the masked representation of the risk information data.

In some embodiments some or all steps of any of the previously described embodiments may be performed on a client device. In some embodiments the client device may comprise a personal telecommunication device such as a smartphone or a tablet. In some embodiments the client device may run an authentication client application or an authentication client app that may perform some or all steps of any of the previously described methods for generating an enhanced OTP.

Another aspect of the invention provides a method for validating an enhanced OTP. In some embodiments the enhanced OTP may have been generated using a method of any of the previously described embodiments of a method for generating an enhanced OTP. In some embodiments the enhanced OTP may have been generated by: performing a first risk analysis, generating risk information data representing a result of said first risk analysis, determining a first value of a dynamic variable, generating cryptographic OTP data by cryptographically combining said first value of said dynamic variable with a cryptographic secret, and obtaining said enhanced OTP by combining said cryptographic OTP data with said risk information data. In some embodiments the method may comprise the steps of: retrieving said cryptographic data from said enhanced OTP; retrieving said risk information data from said enhanced OTP; cryptographically verifying said retrieved cryptographic data; performing a second risk analysis using said retrieved risk information data; and determining an overall risk level for said enhanced OTP using the outcome of said cryptographic verification of said retrieved cryptographic data and said second risk analysis.

In some embodiments the enhanced OTP may comprise a masked representation of said risk information data and retrieving said risk information data may comprise using parts of the retrieved cryptographic data to unmask said masked representation of the risk information data.

In some embodiments cryptographically verifying the retrieved cryptographic data may comprise: determining a second value for the dynamic variable, which may be assumed to have the same value as the first value for the dynamic variable, and cryptographically combining this second value with a copy of the cryptographic secret using a symmetric cryptographic algorithm that uses said second value and that is parameterized with said copy of said cryptographic secret. In some embodiments the symmetric cryptographic algorithm may also use the retrieved risk information data. In some embodiments cryptographically verifying the retrieved cryptographic data may comprise comparing the retrieved cryptographic data with the result of said cryptographically combining the second value with the copy of said cryptographic secret.

Yet another aspect of the invention provides a method for securing the interaction of a user with an application, whereby the user may be interacting with an access device to access the application and may further be interacting with a client device associated with the user. In some embodiments the method may comprise generating an enhanced OTP, for example at a client device, and validating the enhanced OTP, for example at a validation or verification server. In some embodiments the enhanced OTP may be generated using any of the methods for generating an enhanced OTP previously described. In some embodiments the enhanced OTP may be validated using any of the methods for validating an enhanced OTP previously described. In some embodiments the method may comprise the steps of: performing, for example at the client device, a first risk analysis; generating, for example at the client device, risk information data representing a result of said first risk analysis; determining, for example at the client device, a first value of a dynamic variable; generating, for example at the client device, cryptographic OTP data by cryptographically combining said first value of said dynamic variable with a cryptographic secret; generating, for example at the client device, an enhanced OTP by combining said cryptographic OTP data with said risk information data; presenting, for example at the client device, said enhanced OTP to said user; receiving, for example at the access device, the enhanced OTP that was presented to the user; retrieving, for example at a validation or verification or application server, said cryptographic data from said enhanced OTP; retrieving, for example at a validation or verification or application server, said risk information data from said enhanced OTP; cryptographically verifying, for example at a validation or verification or application server, said retrieved cryptographic data; performing, for example at a validation or verification or application server, a second risk analysis using said retrieved risk information data; determining, for example at a validation or verification or application server, an overall risk level for said enhanced OTP using the outcome of said cryptographic verification of said retrieved cryptographic data and said second risk analysis; and deciding, for example at a validation or verification or application server, whether or not to perform a certain action depending on the value of said overall risk level.

In some embodiments the second risk analysis may comprise also using information related to other interactions of said user with said application. In some embodiments the second risk analysis may comprise also using information related to other interactions of other users than said user with said application.

In some embodiments said action may comprise granting access to said user, for example to some resource. In some embodiments said action may comprise logging in the user. In some embodiments said action may comprise granting the user some authorization, for example to perform certain actions or transactions. In some embodiments said action may comprise performing a transaction requested by said user. In some embodiments the enhanced OTP may be associated with the transaction requested by the user. In some embodiments the enhanced OTP may be provided to an application together with a transaction request.

Yet another aspect of the invention provides a system for securing the interaction between a user and an application. In some embodiments the system may be adapted to be used with any of the methods for generating an enhanced OTP previously described. In some embodiments the system may be adapted to be used with any of the methods for validating an enhanced OTP previously described. In some embodiments the system may be adapted to be used with any of the methods for securing the interaction of a user with an application described previously.

In some embodiments the system may comprise: a client device operated by the user and comprising a user output interface (such as a display), an access device comprising a user input interface (such as a keyboard) and interacting with the user and allowing the user to interact with the application, and an application server hosting the application. In some embodiments the access device and the application server are comprised in physically different computers, and the access device and the application server may be adapted to communicate over a computer network. The computer network may comprise a local area network, a wide area network, and may comprise the internet.

In some embodiments the client device may be adapted to: perform a first risk analysis; generate risk information data representing a result of said first risk analysis; determine a first value of a dynamic variable; generate cryptographic OTP data by cryptographically combining said first value of said dynamic variable with a cryptographic secret stored on said client device; generate an enhanced OTP by combining said cryptographic OTP data with said risk information data; and present said enhanced OTP to said user using said user output interface. In some embodiments the client device may comprise a personal telecommunication device such as a smartphone. In some embodiments the client device may be adapted to run a client authentication application or a client authentication app for generating an enhanced OTP (for example by any of the methods for generating an enhanced OTP described elsewhere in this description).

In some embodiments the access device may be adapted to receive, using said user input interface, the enhanced OTP that was presented to the user by the client device. In some embodiments the access device may be further adapted to forward the enhanced OTP to the application server. In some embodiments the access device may comprise, for example, a laptop or a Personal Computer (PC) that may, for example, be connected to the internet. In some embodiments the access device may run a web browser to allow the user to connect to a web server and interact with a web application, which may be comprised in the application, hosted by the webserver.

In some embodiments the application server may be adapted to: retrieve said cryptographic data from said enhanced OTP; retrieve said risk information data from said enhanced OTP; cryptographically verify said retrieved cryptographic data; perform a second risk analysis using said retrieved risk information data; determine an overall risk level for said enhanced OTP using the outcome of said cryptographic verification of said retrieved cryptographic data and said second risk analysis; and decide whether or not to perform a certain action depending on the value of said overall risk level. In some embodiments the application server may comprise one or more server computers. In some embodiments the computers comprised in the application server may be connected by a computer network (for example, a local area network, a wide area network, or the internet). In some embodiments the application server may host a server part of the application. In some embodiments the application server may be connected to the internet. In some embodiments the application server and the access device may be connected by the internet. In some embodiments the application may comprise a web-based application that may be hosted by the application server.

Client-Side Risk Analysis

In some embodiments of the invention, the client device may be configured to gather information about local risk factors such as, for example, information about the platform the client device has been implemented on, information about the context wherein the client device is operating, and information about the user that is operating the client device. In some embodiments the client device may be configured to condense this risk factor related information into a small number of bits.

In some embodiments the client device may be configured to gather information about local risk factors and to perform a first client-side risk analysis. In some embodiments the bits representing the condensed risk factor related information (which henceforth may be referred to in short as the risk information bits) may comprise the result of this first client-side risk analysis.

In some embodiments the client device may determine for each of a set of risk factors a score. In some embodiments the client device may combine the various scores of the separate risk factors into a single overall risk analysis score. In some embodiments the various scores may be represented by Boolean and/or numerical values. In some embodiments the client device may combine scores by applying logical rules, Boolean functions and/or mathematical functions to the scores being combined.

In some embodiments the various risk factors may be grouped into a number of distinct risk factor categories. In some embodiments the client device may determine a score for each category by combining the scores for all the risk factors of that category. In some embodiments the client device may combine the scores of the different categories into a single overall score. In some embodiments the client device may use only one risk factor category. In some embodiments the risk information bits may comprise a binary representation of this overall score. In some embodiments the risk information bits may comprise a concatenation of the binary representations of the scores of the various risk factor categories.

For example, in some embodiments the client device may group the risk factors in a number of risk factor categories which may comprise a platform related risk factor category (Platform Category), a user related risk factor category (User Category), and/or a context related risk factor category (Context Category).

The Platform Category may comprise all risk factors that are related to the platform on which the client device has been implemented. For example, one risk factor in this category may indicate whether the client device is a dedicated hardware token or a software application on, for example, a smartphone. Another risk factor in this category may be determined by the presence or absence (and type) of a virus detector and/or a firewall. Yet another risk factor may be determined by taking into account the detection log of such a virus checker. Still another risk factor of the Platform Category may take into account the type of operating system and/or browser software.

The User Category may comprise all risk factors that are related to the user that is operating the client device. For example, in some embodiments the client device may have a biometric component for capturing a measurement of certain biometric features of the user (such as a fingerprint, iris scan, voice characteristics or facial characteristics) and compare this measurement with a reference template. A score of a biometric risk factor may, for example, indicate the degree that the measurement matches the reference template. Another biometric risk factor may indicate a risk that the biometric measurement is being falsified or circumvented. For example, the client device may be adapted to store recent biometric measurements and detect replay attacks (such as by using a voice recording or a picture of a face) and one biometric risk factor may indicate the probability that a biometric measurement in fact corresponds to a replay attack. In some embodiments the client device may be adapted to receive a PIN or password from the user and may be adapted to compare the received PIN or password with a stored reference value. The client device may be adapted to allow a certain number or retries if the user enters a wrong PIN or password. In such cases a risk factor of the User Category may take into account the actual number of attempts that the user needed to enter the correct PIN or password (whereby the fact that the correct PIN or password was not entered at the first try could indicate that someone had to guess the PIN or password). Another risk factor of the User Category may be related to the behaviour of the user (e.g., which applications the user accesses and in what order and with which frequency, how the user uses the input interface, etc.) and the score of this risk factor may be determined by an analysis of this behaviour. For example, in some embodiments the client device may be adapted to receive a PIN or password from the user. The client device may be adapted to analyse patterns in the user's entering the separate digits or characters of the PIN or password. For example, the client device may measure the series of time differences associated with the user entering the consecutive digits or characters of the PIN or password. For a specific user this series of time differences may on average have a certain pattern that may be more or less characteristic of a specific user. If another user were to enter the same PIN or password this could result in a series of time differences that may deviate significantly from the original user's average pattern. The client device may determine a risk factor score as a function of the degree to which a given series of time differences for a specific PIN or password entry deviates from the user's average pattern of time differences for PIN or password entry. For example, the higher the degree of deviation, the higher the score that the client device may assign to this risk factor.

The Context Category may comprise all risk factors that are related to the local context in which the client device is being operated. For example, in some embodiments the client device may comprise a geolocation component (such as a Global Position System (GPS) component) which may be capable of providing an indication of the geographic location at any time of the client device and the client device may define a number of geographic zones (for example, a home zone, a neighbouring zone and a remote zone; or, for example, a local zone, a regional zone, a national zone and a foreign zone) and associate a different score with each zone, determine on the basis of the geolocation information of the geolocation component in which zone the client device is located and determine the score of a geolocation risk factor by taking the score associated with the zone where the client device is located at that moment. In some embodiments the client device may be adapted to determine the local time zone and may use the local time zone as a proxy for the geographic location.

In some embodiments the client device may be adapted to keep track of the geographic locations where the user uses the client device for generating an OTP. In general, the historic range of locations where a user has used the client device for generating an OTP tends to show a pattern with some locations occurring much more than others. The client device may associate a risk factor to the degree to which a given geographic location where the client device generates an OTP deviates from the user's historic pattern. When the client device is about to generate a new OTP, the client device may compare the actual location of the client device with the history of locations and determine a score for this risk factor based on this comparison. For example, the more the actual location is unusual for the user in view of the past locations where the user has already generated an OTP before, the higher the score that the client device may assign to this risk factor.

In some embodiments the client device may allocate to each risk factor category a fixed number of bits to represent the score of that risk factor category. In some embodiments the number of bits allocated to each risk factor category is the same for all risk factor categories. In other embodiments the number of bits allocated to each risk factor category may vary from one risk factor category to another. In some embodiments the client device may determine the risk information bits by concatenating the bits representing the scores for the various risk factor categories. For example, in some embodiments a single bit may be allocated to each risk factor category and the risk information bits may consist of the concatenation of all these single bits.

For example, in some embodiments the client device may represent the score for each risk factor by means of a numerical risk factor. The client device may combine the numerical scores of the various risk factors of the same category by adding the scores of the risk factors of that category whereby the score of each risk factor has first been multiplied with a weighting factor that is specific for that risk factor. The resulting sum for that category may then be compared to a threshold factor which may be specific for each different category and the result of that comparison may determine a Boolean value which is the overall Boolean score of that category and which may be represented by a single bit. The client device may determine the risk information bits by concatenating the bits representing the Boolean score values of the various categories. In other words, the risk information bits may consist of a bit string wherein each bit in the string indicates for the particular risk factor category corresponding to that particular bit whether or not the weighted sum of the numerical scores of the various risk factors belonging to that particular risk factor category exceeds the specific threshold value associated with that particular risk factor category.

In some embodiments the number of risk information bits is limited to no more than 12 bits. In some embodiments the number of risk information bits is no more than 8 bits. In some embodiments the number of risk information bits is no more than 4 bits. In some embodiments the number of risk information bits is 3 bits.

Passing the Risk Information Bits to the Server

In some embodiments the client device may be adapted to pass the risk information bits together with the generated OTP or as part of the OTP to the server for further analysis. In what follows an OTP comprising risk information bits may be referred to as an Enhanced OTP. An Enhanced OTP may therefore be viewed as comprising on the one hand cryptographic data that are the result of the cryptographic combination of the dynamic variable with the cryptographic secret shared with the server, and comprising on the other hand risk information data conveying the risk information bits. Depending on the context, the terminology OTP may then refer to an OTP not containing any risk information data, the part of an Enhanced OTP not containing any risk information data, or just shorthand for an Enhanced OTP.

In some embodiments the information conveyed by bits representing the condensed risk factor related information may be kept hidden or may be masked. For example, these risk information bits may be scrambled using bits of the cryptographic data of the OTP to mask the values of the bits representing the condensed risk factor related information. That is, the risk information data in the Enhanced OTP may be masked using all or a part of the cryptographic data of the original OTP.

In some embodiments the risk information bits are appended to the cryptographic OTP bits. In some embodiments the risk information bits are processed using Boolean logic (e.g., the exclusive "or" operation or other operations) with certain cryptographic OTP bits. In some embodiments the Enhanced OTP comprises a string of decimal digits (i.e., base-10 digits) and the Enhanced OTP may comprise on the one hand a series of decimal digits representing cryptographic OTP data (i.e., data obtained by the cryptographic combination of the dynamic variable with the cryptographic secret shared with the server), and may comprise on the other hand decimal digits that are obtained by adding or subtracting decimal digits encoding the risk information bits with decimal digits that are obtained by the cryptographic combination of the dynamic variable with the cryptographic secret shared with the server, wherein said adding or subtracting is done modulo 10. More generally, in some embodiments the Enhanced OTP comprises a string of base-N digits (with N an integer number larger than 1) and the Enhanced OTP may comprise on the one hand a series of base-N digits representing cryptographic OTP data (i.e. data obtained by the cryptographic combination of the dynamic variable with the cryptographic secret shared with the server), and may comprise on the other hand base-N digits that are obtained by adding or subtracting base-N digits encoding the risk information bits with certain base-N digits that are obtained by the cryptographic combination of the dynamic variable with the cryptographic secret shared with the server.

In some embodiments the integrity of the bits representing the condensed risk factor related information as determined by the client device may be protected. In some embodiments the integrity of the bits representing the condensed risk factor related information as determined by the client device may be cryptographically protected. In some embodiments the bits representing the condensed risk factor related information may be included in the cryptographic process to generate the OTP. In some embodiments the risk information bits are included in the dynamic variable. For example, in some embodiments the client device may use the risk information bits as an extra variable along the dynamic variable and the client device may combine both the dynamic variable and the risk information bits with the shared cryptographic secret. In some embodiments the client device may first combine the risk information bits with some dynamic value (such as a time value, counter value, challenge, transaction data, etc.) to obtain the value of the dynamic variable that the client device may then cryptographically combine with the shared cryptographic secret to generate the cryptographic OTP data. For example, in some embodiments the risk information bits may be appended to the dynamic value and the resulting value may then be cryptographically combined with the shared cryptographic secret. For example, in some embodiments the resulting value may be encrypted with a symmetric encryption algorithm (such as AES) parameterized with the shared cryptographic secret, or the resulting value may be submitted to a keyed hashing algorithm (such as HMAC) that is parameterized with the shared cryptographic secret. In some embodiments the client device may then add risk information data (representing the risk information bits) to these cryptographic OTP data, for example as explained above, to obtain an Enhanced OTP.

In some embodiments the client device may use a user output interface of the client device to present the generated Enhanced OTP to the user for the user to transfer the Enhanced OTP to an application. For example, the client device may display a string of digits representing the Enhanced OTP on a display of the client device to the user. The user, who may be accessing an application using an access device, such as a laptop or a PC (Personal Computer), may read the displayed Enhanced OTP from the display of the client device and may provide the Enhanced OTP to the application, for example by providing the Enhanced OTP to a user input interface of the access device (for example, by entering the digits of the Enhanced OTP on the keyboard of the access device) whereupon the access device may forward the Enhanced OTP provided by the user to the application.

In some embodiments the application may use the Enhanced OTP that it receives from the user to decide upon taking further action such as deciding which authorizations to give to a user, whether or not to grant access to the user, whether to accept a transaction submitted by the user, etc. In some embodiments the application may use a verification server to validate the received Enhanced OTP. In some embodiments the verification server may be a separate entity of the application. In some embodiments the verification server may be included in the application.

Server-Side Risk Analysis

In some embodiments the verification server may, upon receiving the Enhanced OTP, extract the risk information bits from the received Enhanced OTP, verify the cryptographic validity of (the remainder of) the Enhanced OTP and perform a second server-side risk analysis using the risk information bits extracted from the received Enhanced OTP.

In some embodiments extracting the risk information bits from the received Enhanced OTP may comprise reversing the operations that were applied at the client device to mask the Enhanced OTP when the risk information bits were combined at the client device with the cryptographic data to obtain the Enhanced OTP. For example, in some embodiments the Enhanced OTP may comprise a concatenation of, on the one hand, a string of base-N digits representing the cryptographic data of the Enhanced OTP (that may have been obtained by the client device by cryptographically combining the risk information bits, a dynamic value and the shared cryptographic secret), and may, on the other hand, comprise a string of masked base-N digits encoding the risk information bits whereby the client device may have masked a string of base-N digits encoding the risk information bits by doing a digit by digit modulo-N addition (or subtraction) of each base-N digit encoding risk information bits with one of the base-N digits representing the cryptographic data. Retrieving the risk information bits from the Enhanced OTP may comprise separating the masked digits encoding the risk information bits and the digits representing the cryptographic data from the aforementioned concatenation. Retrieving the risk information bits from the Enhanced OTP may further comprise unmasking the masked digits encoding the risk information bits by doing a digit by digit modulo-N subtraction (or addition) of each masked digit with the corresponding digit of the cryptographic data that was used by the client device in the masking operation. Retrieving the risk information bits from the Enhanced OTP may further comprise decoding the string of unmasked base-N digits that the client device used to encode the risk information bits.

In some embodiments verifying the cryptographic validity of the Enhanced OTP may comprise retrieving the cryptographic data from the Enhanced OTP and it may also comprise retrieving the risk information bits from the Enhanced OTP, as described in more detail above. In some embodiments verifying the cryptographic validity of the Enhanced OTP may comprise verifying the cryptographic validity of the retrieved cryptographic data. In some embodiments verifying the cryptographic validity of the Enhanced OTP may comprise performing cryptographic operations using a server copy of the shared cryptographic secret. In some embodiments verifying the cryptographic validity of the Enhanced OTP may comprise determining a server copy of the dynamic variable that is assumed to have been used by the client device for the generation of the cryptographic data of the Enhanced OTP. In some embodiments verifying the cryptographic validity of the Enhanced OTP may comprise cryptographically combining the server copy of the dynamic variable with the server copy of the shared cryptographic secret. In some embodiments cryptographically combining the server copy of the dynamic variable with the server copy of the shared cryptographic secret may be done with substantially the same symmetric cryptographic algorithm that was used by the client device to generate the cryptographic data. In some embodiments verifying the cryptographic validity of the Enhanced OTP may comprise comparing the received Enhanced OTP with the result of cryptographically combining the server copy of the dynamic variable with the a server copy of the shared cryptographic secret. In some embodiments verifying the cryptographic validity of the Enhanced OTP may comprise cryptographically combining the retrieved risk information bits and the server copy of the dynamic variable with the server copy of the shared cryptographic secret. In some embodiments cryptographically combining the retrieved risk information bits and the server copy of the dynamic variable with the server copy of the shared cryptographic secret may be done with substantially the same symmetric cryptographic algorithm that was used by the client device to generate the cryptographic data. In some embodiments verifying the cryptographic validity of the Enhanced OTP may comprise comparing the received Enhanced OTP with the result of cryptographically combining the retrieved risk information bits and the server copy of the dynamic variable with the server copy of the shared cryptographic secret.

In some embodiments the server may reject the received Enhanced OTP in any case if the verification of the cryptographic validity of the OTP fails. In some embodiments, if the verification of the cryptographic validity of the OTP is successful, the server may accept the OTP as being cryptographically correct and may assign a quality level to the Enhanced OTP dependent on the outcome of the second risk analysis. Alternatively, the server may assign a risk level to the Enhanced OTP based on the outcome of the cryptographic verification and the second risk analysis.

In some embodiments the second risk analysis is done on the basis of the risk information bits retrieved from the Enhanced OTP. In some embodiments the second risk analysis is done on the basis of the different scores for the different risk factor categories that the client device has encoded in the risk information bits that have been retrieved from the Enhanced OTP. In some embodiments the risk information bits encode the scores as determined by the client device for a number of risk factor categories and the second risk analysis comprises comparing these scores encoded in the risk information bits with score reference values. For example, in some embodiments a score reference value may comprise a threshold value and the corresponding score encoded in the risk information bits may be compared to that threshold value and a Boolean flag may be set for a risk factor category if the score encoded for that risk factor category exceeds its corresponding threshold value. In some embodiments a score reference value may comprise a scaling value and the corresponding score encoded in the risk information bits may be compared to that scaling value and a numerical risk estimation may be calculated for a risk factor category by multiplying (or dividing) the score encoded for that risk factor category by the corresponding scaling value. In some embodiments the second risk analysis comprises determining Boolean flags for a number of risk factor categories and combining these Boolean flags using one or more Boolean functions. In some embodiments the second risk analysis comprises determining numerical values for a number of risk factor categories and combining these numerical values using arithmetical calculations. In some embodiments the second risk analysis may be parameterizable by the application such that, for example, certain risk factor categories can be given another weight in the analysis than others dependent on the parameter values provided by the application.

In some embodiments the second risk analysis may also involve other information than information retrieved from the received Enhanced OTP. In some embodiments the server may use information associated with the user or information associated with a transaction for which the Enhanced OTP may have been generated. In some embodiments the server may use information related to other users or other transactions. For example, in some embodiments the server may use information about Enhanced OTPs that may have been generated for transactions that have been found to be fraudulent. For example, in some embodiments the server may increase the weight of a risk factor category if in a set of recent fraudulent transactions the score of that risk factor category had an abnormal value.

In some embodiments the result of the second risk analysis is a risk level or a quality level that the server may assign to the Enhanced OTP or to a transaction request that may be associated with the Enhanced OTP. In some embodiments the quality level or the risk level that the server assigns to the received Enhanced OTP might be uni-dimensional. In some embodiments the risk or quality level assigned to the OTP may be represented by a number. In some embodiments this number can have any value in a continuous range of numerical values. In some embodiments this number can only have one of a limited set of discrete values. In some embodiments the quality or risk level assigned to the OTP may be multidimensional. In some embodiments the risk or quality level assigned to the OTP may be represented by a vector. In some embodiments at least some of the components of the vector may be numbers. In some embodiments some of these numbers may have one of a limited set of discrete values. In some embodiments some of these numbers may have any value in a continuous range of numerical values.

In some embodiments the application may take a decision on whether to accept the OTP based on the quality level or risk level assigned to the OTP or to a transaction associated with that OTP after the second risk analysis. Depending on the quality level or risk level assigned to the OTP or to a transaction associated with that OTP the application may, for example, decide whether or not to grant access to the user or to accept the transaction submitted by the user and associated with that OTP.

BRIEF DESCRIPTION OF THE DRAWINGS

The foregoing and other features and advantages of the described embodiments will be apparent from the following, more particular description of embodiments of aspects of the invention, as illustrated in the accompanying drawings.

DETAILED DESCRIPTION

Some implementations of the described embodiments are discussed below. While specific implementations are discussed, it should be understood that this is done for illustration purposes only. A person skilled in the relevant art will recognize that other components and configurations may be used without parting from the spirit and scope of the invention.

Figure 1:
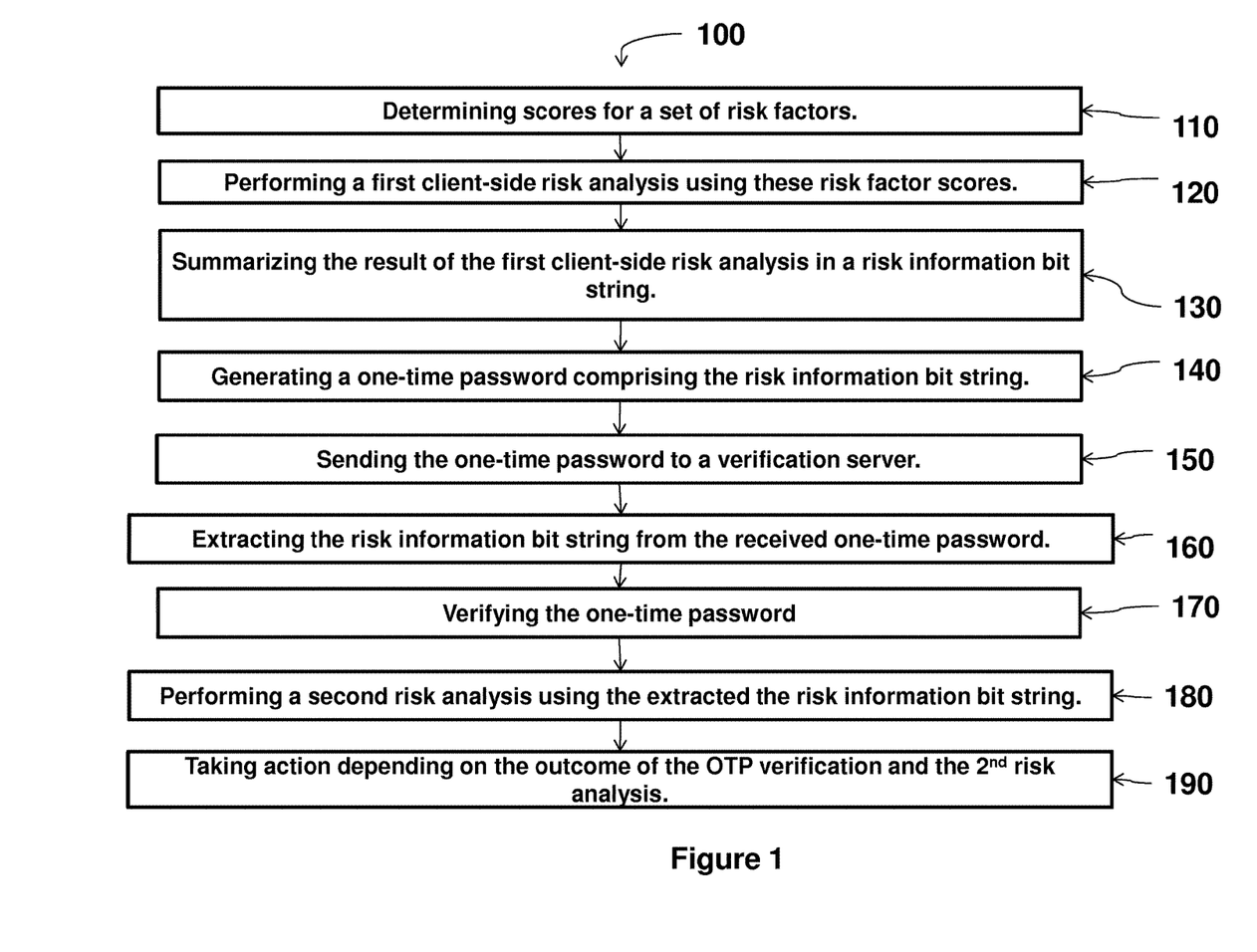
FIG. 1 schematically illustrates an exemplary method according to an aspect of the invention.

FIG. 1 schematically illustrates an exemplary method (100) according to an aspect of the invention. The method may comprise the steps of: at an authentication client device locally determining (110) scores for a set of risk factors, at the authentication client device performing (120) a first client-side risk analysis using these risk factor scores, at the authentication client device summarising (130) the result of this first client-side risk analysis in a short risk information bit string, at the authentication client device generating (140) a one-time password by cryptographically combining a dynamic variable with a secret key that is shared with a verification server and merging the risk information bit string with the result of the cryptographic combination, sending (150) the one-time password to the verification server, at the verification server extracting (160) the risk information bit string from the received one-time password, at the verification server cryptographically verifying (170) the one-time password using the shared secret key, at the verification server performing (180) a second risk analysis using the extracted risk information bit string, taking appropriate action (190) depending on the result of the second risk analysis and the cryptographic verification of the one-time password.

The above-described teachings may be implemented in apparatus form (e.g., a client side apparatus performing a risk analysis and/or a host-side apparatus performing a risk analysis), system form (a client-side, host-side, client-host combination), and/or a method of performing a risk analysis.

Figure 2:
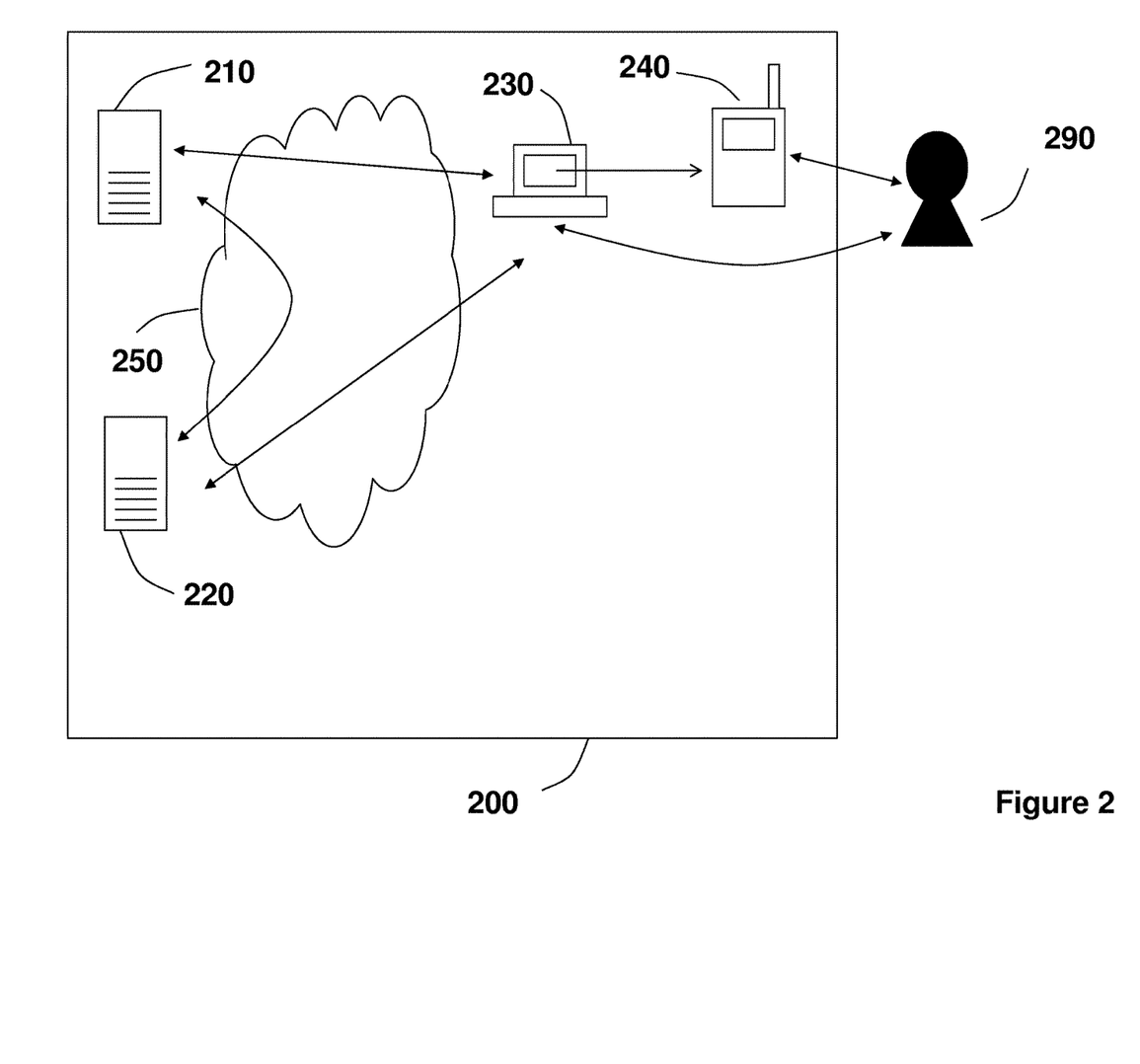
FIG. 2 schematically illustrates an exemplary system according to an aspect of the invention.

FIG. 2 schematically illustrates an exemplary system (200) according to an aspect of the invention. In some embodiments a system for securing an interaction between an application and a user such as the system (200) illustrated in FIG. 2 may comprise: an application server (210) for hosting server parts of the application; an access device (230) for allowing the user (290) to (remotely) access the application; an authentication client device (240) for generating an Enhanced OTP; and a verification server (220) for validating the Enhanced OTP and performing a second risk analysis on the Enhanced OTP; whereby the application server(s) and the access device may be connected and communicate with each other over a computer network (250) (which may include a local area network, a wide area network, the internet, and a combination thereof), the access device may be adapted to run a client part of the application, the authentication client device may be adapted to present the generated Enhanced OTP to the user, the access device may be further adapted to forward the generated dynamic credential to the application server or verification server for validation; the verification server may be adapted to signal to the application server whether the Enhanced OTP has been verified to be valid and/or to communicate to the application server a risk level or a quality level that may have been assigned to the Enhanced OTP.

In some embodiments the system may be adapted to perform any of the methods described above for generating and validating an Enhanced OTP.

In some embodiments the verification server may be adapted to perform any of the methods described above for validating an Enhanced OTP. In some embodiments the application server and the verification server may be the same server. In some embodiments the application server and the verification server may comprise one or more server computers. In some embodiments the computer network may comprise the internet and/or a wireless telecommunications network. Similarly, the computer network could be a local area network, a wide area network and/or a combination of each that includes a telecommunications network and/or the internet.

In some embodiments the access device may have a user interface for locally interacting with the user. For example, in some embodiments the access device may have a user input interface such as a keyboard, a mouse, or a touchscreen for receiving user input. In some embodiments the access device may have a user output interface, such as a display or a loudspeaker, for presenting output, which may comprise visual or auditory signals, to a user. In some embodiments the access device may comprise a PC (personal computer), tablet computer, or smartphone.

In some embodiments the application (such as an internet banking application) may comprise a server part that is running on a remote application server and a client part that is running on the user's access device and that the user interacts with to access the server part of the application over, for example, the internet. In some embodiments the application may comprise a web-based application and the application server may comprise a web server. In some embodiments the application server may be accessed by the user using a web browser on the user's access device. In some embodiments the client part of the application may comprise an applet (such as a java applet) or a script running in a web browser on the user's host computer. In some embodiments the user may access the server part of an application with a smartphone. The smartphone may then function as the access device (230) and the client application running on the smartphone may comprise an app (such as an internet banking app) on the smartphone whereby the app may interact with the user through the user interface of the smartphone, and with the application server over, for example, the internet.

In some embodiments the authentication client device may have a user interface for locally interacting with the user. For example, in some embodiments the authentication client device may have a user input interface such as a keyboard, a mouse, or a touchscreen for receiving user input. In some embodiments the authentication client device may have a user output interface, such as a display or a loudspeaker, for presenting output, which may comprise visual or auditory signals, to a user. In some embodiments the authentication client device may comprise a tablet computer or smartphone. In some embodiments the authentication client device may have an operating system such as a version of Android or Windows for Mobile or Windows Phone. In some embodiments the authentication client device may run an authentication application for generating the Enhanced OTP. In some embodiments the authentication device may be adapted to perform any of the methods described earlier for generating an Enhanced OTP.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. A method for generating at a client device associated with a user an enhanced OTP comprising the steps of:
performing, at the client device, a risk analysis comprising making a risk assessment for each of one or more risk factors;
generating, at the client device, risk information data representing a result of said risk analysis, generating the risk information data comprising combining the results of all said risk assessments of said one or more risk factors;
determining, at the client device, a first value of a dynamic variable;
generating, at the client device, cryptographic OTP data by cryptographically combining said risk information data and said first value of said dynamic variable with a cryptographic secret; and
obtaining, at the client device, said enhanced OTP by combining said cryptographic OTP data with said risk information data.

2. The method of claim 1 wherein said first risk analysis comprises grouping said one or more risk factors into one or more risk factor categories and determining for each of said one or more risk factor categories a risk assessment category score using the results of said risk assessments of all risk factors of the corresponding risk factor category and wherein said generating the risk information data comprises combining the risk assessment category scores of said one or more risk factor categories.

3. The method of claim 2 wherein each risk assessment category score is represented as a bit string and wherein said generating the risk information data comprises concatenating the bits of the various bit strings corresponding to said one or more risk factor categories into a risk information bit string and wherein said risk information data comprises a representation of said risk information bit string.

4. The method of claim 2 wherein the first risk analysis is done on a client device that is being operated by a user and wherein said one or more risk factor categories comprise at least one of:
a platform risk factor category, that groups all risk factors related to characteristics of the client device itself;
a user risk factor category, that groups all risk factors related to characteristics of the user and characteristics of the behaviour of the user;
a context risk factor category, that groups all risk factors related to characteristics of the context or the environment in which the client device is operating.

5. The method of claim 4 said one or more risk factor categories comprise also three of said platform risk category, said user risk factor category and said context risk factor category.

6. The method of claim 1 wherein said cryptographically combining said first value of said dynamic variable with said cryptographic secret comprises performing a symmetric cryptographic algorithm that uses said value of said dynamic variable and that is parameterized with said cryptographic secret.

7. The method of claim 6 wherein said symmetric cryptographic algorithm also uses said risk information data.

8. The method of claim 1 wherein said dynamic variable is time-based.

9. The method of claim 1 wherein said dynamic variable is counter-based.

10. The method of claim 1 wherein said dynamic variable is based on a challenge.

11. The method of claim 1 wherein said dynamic variable is based on data representative of a transaction request with which the enhanced OTP is associated.

12. The method of claim 1 wherein obtaining said enhanced OTP by combining said cryptographic OTP data with said risk information data comprises generating a masked representation of said risk information data using said risk information data and a part of said cryptographic OTP data, and combining said cryptographic OTP data with said masked representation of the risk information data.

13. A method for validating an enhanced OTP,
whereby said enhanced OTP has been generated at a client device associated with a user by:
performing, at the client device, a first risk analysis comprising making a risk assessment for each of one or more risk factors,
generating, at the client device, risk information data representing a result of said first risk analysis, generating the risk information data comprising combining the results of all said risk assessments of said one or more risk factors,
determining, at the client device, a first value of a dynamic variable,
generating, at the client device, cryptographic OTP data by cryptographically combining said risk information data and said first value of said dynamic variable with a cryptographic secret, and
obtaining, at the client device, said enhanced OTP by combining said cryptographic OTP data with said risk information data;
the method comprising the steps of:
retrieving said cryptographic data from said enhanced OTP;
retrieving said risk information data from said enhanced OTP;
cryptographically verifying said retrieved cryptographic data;
performing a second risk analysis using said retrieved risk information data; and
determining an overall risk level for said enhanced OTP using the outcome of said cryptographic verification of said retrieved cryptographic data and said second risk analysis.

14. The method of claim 13 whereby said enhanced OTP comprises a masked representation of said risk information data and whereby retrieving said risk information data comprises using parts of the retrieved cryptographic data to unmask said masked representation of the risk information data.

15. The method of claim 13 whereby said cryptographically verifying said retrieved cryptographic data comprises:
determining a second value for said dynamic variable; and
cryptographically combining said second value with a copy of said cryptographic secret using a symmetric cryptographic algorithm that uses said second value and that is parameterized with said copy of said cryptographic secret.

16. The method of claim 15 whereby said symmetric cryptographic algorithm also uses said retrieved risk information data.

17. The method of claim 15 whereby said cryptographically verifying said retrieved cryptographic data comprises comparing said retrieved cryptographic data with the result of said cryptographically combining said second value with said copy of said cryptographic secret.

18. A method for securing the interaction of a user with an application, the user interacting with an access device to access the application and further interacting with a client device associated with the user, the method comprising the steps of:
at the client device, performing a first risk analysis comprising making a risk assessment for each of the one or more risk factors;
at the client device, generating risk information data representing a result of said first risk analysis, generating the risk information data comprising combining the results of all said risk assessments of said one or more risk factors;
at the client device, determining a first value of a dynamic variable;
at the client device, generating cryptographic OTP data by cryptographically combining said risk information data and said first value of said dynamic variable with a cryptographic secret;
at the client device, generating an enhanced OTP by combining said cryptographic OTP data with said risk information data;
at the client device, presenting said enhanced OTP to said user;
at the access device, receiving the enhanced OTP that was presented to the user;
retrieving said cryptographic data from said enhanced OTP;
retrieving said risk information data from said enhanced OTP;
cryptographically verifying said retrieved cryptographic data;
performing a second risk analysis using said retrieved risk information data;
determining an overall risk level for said enhanced OTP using the outcome of said cryptographic verification of said retrieved cryptographic data and said second risk analysis; and
deciding whether or not to perform a certain action depending on the value of said overall risk level.

19. The method of claim 18 wherein said second risk analysis comprises also using information related to other interactions of said user with said application.

20. The method of claim 18 wherein said second risk analysis comprises also using information related to other interactions of other users than said user with said application.

21. The method of claim 18 wherein said action comprises granting access to said user.

22. The method of claim 18 wherein said action comprises granting an authorization to said user.

23. The method of claim 18 wherein said action comprises performing a transaction requested by said user.

24. A system for securing the interaction between a user and an application comprising:
a client device operated by said user and comprising a user output interface;
an access device comprising a user input interface and interacting with said user and allowing said user to interact with said application; and
an application server hosting said application and, if said application server and said access device comprise physically different computers, communicating with said access device over a computer network;
whereby said client device is adapted to:
perform a first risk analysis comprising making a risk assessment for each of one or more risk factors;

generate risk information data representing a result of said first risk analysis, generating the risk information data comprising combining the results of all said risk assessments of said one or more risk factors;

determine a first value of a dynamic variable;

generate cryptographic OTP data by cryptographically combining said risk information and said first value of said dynamic variable with a cryptographic secret stored on said client device;

generate an enhanced OTP by combining said cryptographic OTP data with said risk information data; and present said enhanced OTP to said user using said user output interface;

whereby said access device is adapted to:
receive, using said user input interface, the enhanced OTP that was presented to the user by the client device; and whereby said application server is adapted to:
retrieving said cryptographic data from said enhanced OTP;
retrieving said risk information data from said enhanced OTP;
cryptographically verifying said retrieved cryptographic data;
performing a second risk analysis using said retrieved risk information data;
determining an overall risk level for said enhanced OTP using the outcome of said cryptographic verification of said retrieved cryptographic data and said second risk analysis; and
deciding whether or not to perform a certain action depending on the value of said overall risk level.

25. The system of claim 24 wherein said client device comprises a personal telecommunication device.

* * * * *